(12) United States Patent
Nakayama

(10) Patent No.: US 8,335,285 B2
(45) Date of Patent: Dec. 18, 2012

(54) COMMUNICATION APPARATUS

(75) Inventor: Takashi Nakayama, Chiba (JP)

(73) Assignee: Sony Corporation, Tokyo (JP)

( * ) Notice: Subject to any disclaimer, the term of this patent is extended or adjusted under 35 U.S.C. 154(b) by 828 days.

(21) Appl. No.: 12/432,981

(22) Filed: Apr. 30, 2009

(65) Prior Publication Data

US 2009/0274228 A1 Nov. 5, 2009

(30) Foreign Application Priority Data

May 2, 2008 (JP) ................................ P2008-120688

(51) Int. Cl.
*H03D 1/04* (2006.01)
(52) U.S. Cl. ........................................................ 375/346
(58) Field of Classification Search ................... 375/346
See application file for complete search history.

(56) References Cited

U.S. PATENT DOCUMENTS

| 2006/0084402 | A1 | 4/2006 | Oshima et al. | |
|---|---|---|---|---|
| 2007/0223608 | A1 | 9/2007 | Nakayama | |
| 2008/0088389 | A1 | 4/2008 | Iida | |
| 2009/0323873 | A1* | 12/2009 | Hunter et al. | 375/350 |

FOREIGN PATENT DOCUMENTS

| EP | 0 542 520 A2 | 5/1993 |
|---|---|---|
| EP | 1 838 007 A1 | 9/2007 |
| JP | 7-015391 | 1/1995 |
| JP | 2000-134174 | 5/2000 |
| JP | 2007-060410 | 3/2007 |
| JP | 2007-166066 | 6/2007 |
| JP | 2007-166068 | 6/2007 |
| JP | 2007-258904 | 10/2007 |
| JP | 2008-17220 | 1/2008 |
| WO | WO 2008/032635 A1 | 3/2008 |

OTHER PUBLICATIONS

H. Yamaguchi, "Active Interference Cancellation Technique for MB-OFDM Cognitive Radio", pp. 1105-1108, Microwave Conference, 2004. 34th European Amsterdam, The Netherlands, Oct. 13, 2004.
European Search Report mailed Jul. 16, 2010, in EP 09 15 9167.
Extended European Search Report mailed Feb. 24, 2011, in EP 09 15 9167.7.
Yamaguchi H, "Detection and Avoidance (DAA) Technology for UWB—Challenges to share the frequency resource", Institute of Electronics, Information and Communication Engineers, Technical Report, vol. 105, No. 625, pp. 11-18, (2006).
Notification of Reasons for Refusal, issued Apr. 20, 2010 with English language translation from the Japanese Patent Office in corresponding Japanese Patent application No. 2008-120688.

* cited by examiner

*Primary Examiner* — Kevin Kim
(74) *Attorney, Agent, or Firm* — Finnegan, Henderson, Farabow, Garrett & Dunner LLP

(57) ABSTRACT

A communication apparatus includes a radio-frequency transmission-reception processing unit configured to perform radio-frequency processing to a transmitted signal and a received signal; a baseband processing unit configured to perform baseband processing; a signal detecting unit configured to detect a signal from which a signal transmitted from another communication system is detected; and an interference-to-another-communication-system avoiding unit configured to suppress an interfering signal to the other communication system in radio-frequency transmission processing by the radio-frequency transmission-reception processing unit if the signal detecting unit detects a signal.

9 Claims, 4 Drawing Sheets

COMMUNICATION APPARATUS

BACKGROUND OF THE INVENTION

1. Field of the Invention

The present invention relates to communication apparatuses that perform wireless communication operations while avoiding interference with existing communication systems and coexisting with the communication systems. More particularly, the present invention relates to a communication apparatus capable of flexibly selecting the frequency that is used by acquiring the surrounding radio environment with its radio device and adoptively switching the communication parameter of the radio device in accordance with the acquired surrounding radio environment.

2. Description of the Related Art

Prevalence of wireless communication technologies in recent years is accompanied by a problem of the shortage of frequency resources that has become obvious. Solutions to such problems include new exploitation of millimeter waves and effective use of micro waves that have been used. As a method for the effective use of the micro waves, a "cognitive radio" technology attracts attention. The cognitive radio technology adaptively performs optimal communication in order to avoid interference with existing communication systems and to coexist with the communication systems.

In the cognitive radio communication, a communication system or a radio communication apparatus temporarily shares the frequency band that is originally allocated to another communication system or another radio communication apparatus with the other communication system or the other radio communication apparatus on the assumption that interference with the other communication system or the other radio communication apparatus is avoided. Specifically, the cognitive radio communication is realized by a radio device, such as a terminal or a base station, which acquires the surrounding radio environment and adoptively switches the communication parameter of the radio device in accordance with the acquired surrounding radio environment to flexibly select the frequency that is used. Since the cognitive radio technology is capable of actively achieving the effective use of frequencies, the cognitive radio technology is much expected in recent years as a communication technology that greatly and fundamentally changes the way how to ensure the radio system in related art staring from the allocation of the frequencies. For example, standardization of the cognitive radio communication is promoted in IEEE802.22.

It is necessary to periodically check whether the frequency band is used because the radio communication channels to be used may not be constantly available in the cognitive radio communication. Accordingly, the cognitive radio communication has a problem in that the ratio of the check time to the communication time is increased. For example, a radio communication apparatus is proposed, in which the check is performed in a first time period, the data communication is performed in a second time period, the sum of which and the first time period is equal to a constant value, and the first and second time periods are determined in accordance with the frequency band selected through the check to realize the efficient cognitive radio communication (for example, refer to Japanese Unexamined Patent Application Publication No. 2007-60410).

With the view of the effective use of frequencies, the relationship between an existing radio system and a cognitive radio system is of importance in order to share the same frequency band between the existing radio system and the cognitive radio system. Selectively using the frequency band of one radio device in an existing communication system from multiple frequency bands that are prepared as candidates for the communication bands in accordance with the surrounding radio environment is called Dynamic Spectrum Access (DSA). When an existing radio system is referred to as a "primary system" and a cognitive radio system is referred to as a "secondary system", it is necessary to minimize the level at which the secondary system interferes with the primary system (hereinafter referred to as interference from the secondary system to the primary system) and the level at which the primary system interferes with the secondary system (hereinafter referred to as interference from the primary system to the secondary system) in the DSA (refer to FIG. 4).

Of methods for sharing frequencies in the DSA, a method receives the most attention in which the primary system does not perform interference management and the secondary system autonomously determines the communication parameter so as not to affect the primary system for the communication.

Detect and Avoid (DAA) applied an ultra-wideband (UWB) radio system using a lower band is familiar as a technology for reducing the interfering level from the secondary system to the primary system. For example, in a multi-band Orthogonal Frequency Division Multiplexing (OFDM) communication system, adopting a low-interference (Low-IF) method at the receiver side prevents a dead band from occurring near the local frequency of the receiver and adopting a Zero-IF method at the transmitter side prevents an image spurious signal caused by the difference in amplitude and phase between IQ signals in quadrature modulation from being generated. This eliminates the need to concurrently perform the avoidance in the DAA both in units of subbands and in units of subcarriers, thereby reducing the load of a countermeasure against the DAA in a baseband unit (for example, refer to Japanese Unexamined Patent Application Publication No. 2007-258904).

A radio communication apparatus is proposed, in which the level of an analog signal that is received is detected to perform the determination by the DAA before the analog signal is subjected to digital conversion, a digital circuit having a function of selecting the frequency is driven when an interfering wave from another communication system is detected to determine the narrowband signal, which is the interfering wave, in units of subcarriers by the DAA, and a notch is made only in the frequency band having the interfering wave in a transmission system to perform the UWB communication. In this radio communication apparatus, it is possible to detect an interfering wave with a smaller consumption power and to avoid the interference in consideration of the efficiency of frequency usage in the UWB communication adopting the OFDM modulation method (for example, refer to Japanese Unexamined Patent Application Publication No 2007-166068).

However, the DAA is highly specialized for UWB radio system and it may be difficult to accommodate the DAA to general cognitive radio systems in a broader sense.

SUMMARY OF THE INVENTION

It is desirable to provide an excellent communication apparatus capable of flexibly selecting the frequency that is used by acquiring the surrounding radio environment with its radio device and adoptively switching the communication parameter of the radio device in accordance with the acquired surrounding radio environment in order to preferably realize cognitive radio communication.

It is also desirable to provide an excellent communication apparatus that serves as the communication apparatus for a cognitive radio system and that is capable of autonomously determine the communication parameter so as to minimize the interfering level from the cognitive radio system to an existing radio system that does not perform interference management and the interfered level from the existing radio system to the cognitive radio system to perform the communication.

According to an embodiment of the present invention, a communication apparatus includes radio-frequency transmission-reception processing means for performing radio-frequency processing to a transmitted signal and a received signal; baseband processing means for performing baseband processing; signal detecting means for detecting a signal from which a signal transmitted from another communication system is detected; and interference-to-another-communication-system avoiding means for suppressing an interfering signal to the other communication system in radio-frequency transmission processing by the radio-frequency transmission-reception processing means if the signal detecting means detects a signal.

The cognitive radio technologies increasingly attract attention in view of the shortage of frequency resources. A typical cognitive radio system is realized by a frequency sharing method in which the primary system does not perform the interference management and the secondary system autonomously performs the communication.

The DAA in which a notch is made only in the frequency band including an interfering wave to perform the communication is familiar as a technology for suppressing the interference from the secondary system to the primary system. However, the DAA is highly specialized for the UWB radio system and it is difficult to accommodate the DAA to general cognitive radio systems in a broader sense. For example, since it is not possible to remove a distortion occurring in the RF processing by performing the spectrum shaping for avoiding the interference from the secondary system to the primary system only to baseband signals, the level at which the interference wave is suppressed and which is desired by the primary system may not be attained.

The communication apparatus according to the embodiment of the present invention actively uses the charge-domain variable filter circuits in the respective RF processing stages of the transmission and reception lines in the typical cognitive radio system in which the primary system does not perform the interference management and the secondary system autonomously performs the communication to realize the frequency sharing method.

The charge-domain variable filter circuit is capable of controlling a transfer function composed of combinations of clock frequencies and charge sampling circuits to vary the frequency characteristics of the charge-domain variable filter circuit itself or to add notch characteristics.

The communication apparatus according to the embodiment of the present invention includes the charge-domain variable filter circuit in its RF transmission processing stage and actively performs the DSA control to the charge-domain variable filter circuit to set each parameter for the charge-domain variable filter circuit so that the charge-domain variable filter circuit has frequency characteristics to suppress an interfering signal component to the primary system. This allows the filtering operation having a smaller amount of variation to be realized, compared with the related art, thereby precisely avoiding the mutual interference between the primary system and the secondary system at a lower cost and with lower power consumption.

With the communication apparatus according to the embodiment of the present invention, the frequencies can be actively and effectively used in the typical cognitive radio system. Accordingly, the communication apparatus according to the embodiment of the present invention produces an effect as a measure against the shortage of frequency resources.

A signal transmitted from the primary system can be detected by the spectrum sensing. For example, when the OFDM modulation method is adopted in the baseband processing unit, a received signal subjected to the OFDM demodulation can be detected in the frequency domain to detect a frequency band including an interference wave with the primary system.

In this case, the interference from the secondary system to the primary system can be suppressed to some extent also by making a notch in the subcarrier interfering with the primary system in the baseband processing unit. Accordingly, in the spectrum shaping in the baseband processing unit, the transmission charge-domain variable filter circuit may be used to suppress an interfering signal from the secondary system to the primary system if a desired level at which the interference wave is suppressed is not attained.

The communication apparatus according to the embodiment of the present invention may be provided with the interference-from-another-communication-system avoiding unit, in addition to the interference-to-another-communication-system avoiding unit, in the RF processing stage. The interference-from-another-communication-system avoiding unit is realized by providing the reception charge-domain variable filter circuit in the RF reception line and sets each control parameter for the reception charge-domain variable filter circuit so that the reception charge-domain variable filter circuit has frequency characteristics to suppress an interfered signal component from the primary system.

For example, the operation for suppressing the interfered signal from the primary system to the secondary system can be performed if the level of the interference wave from the primary system is high and the level of the received signal desired by the secondary system is relatively low to substantially improve the reception sensitivity level.

According to the present invention, it is possible to provide an excellent communication apparatus capable of flexibly selecting the frequency that is used by acquiring the surrounding radio environment with its radio device and adoptively switching the communication parameter of the radio device in accordance with the acquired surrounding radio environment in order to preferably realize the cognitive radio communication.

According to the present invention, it is also possible to provide an excellent communication apparatus that serves as the communication apparatus for a cognitive radio system and that is capable of autonomously determine the communication parameter so as to minimize the interfering level from the cognitive radio system to an existing radio system that does not perform interference management and the interfered level from the existing radio system to the cognitive radio system to perform the communication.

Further features of the present invention will become apparent from the following description of exemplary embodiments with reference to the attached drawings.

DESCRIPTION OF THE PREFERRED EMBODIMENTS

Embodiments of the present invention will herein be described in detail with reference to the attached drawings.

Figure 1:
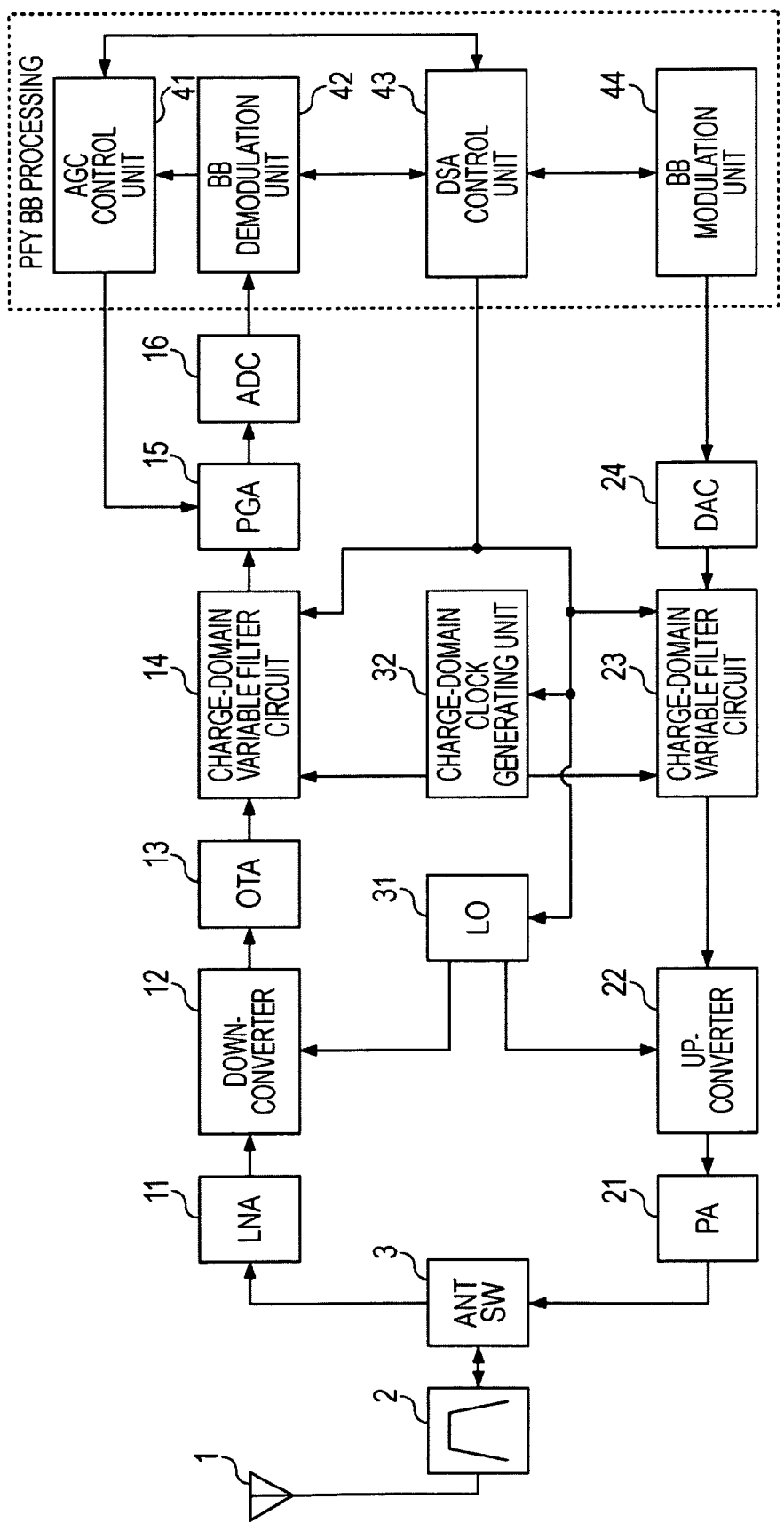
FIG. 1 is a block diagram schematically showing an example of the hardware configuration of a communication apparatus according to an embodiment of the present invention.

FIG. 1 is a block diagram schematically showing an example of the hardware configuration of a communication apparatus according to an embodiment of the present invention. A communication system in FIG. 1 realizes a frequency sharing method in which the primary system does not perform interference management and the secondary system including the communication apparatus autonomously performs the communication.

In the communication apparatus in FIG. 1, an antenna 1 used for both of transmission and reception and a radio-frequency (RF) band pass filter (BPF) 2 attenuate unnecessary signals outside the frequency band that is used and cause only the signals within the used frequency band to pass through. Although an antenna switch 3 is used to separate the received signal from the transmitted signal in the communication apparatus in FIG. 1, another unit such as a duplexer may be used for the separation of the received signal and the transmitted signal.

First, a reception line of the communication apparatus will now be described.

A radio-frequency (RF) signal that is received is subjected to low-noise amplification by a low-noise amplifier (LNA) 11 and is supplied to a down-converter 12. The down-converter 12 uses a local frequency signal supplied from a local oscillator (LO) 31 to convert the received RF signal into a baseband signal. However, the down-conversion method adopted in the down-converter 12 is not restricted to a specific down-conversion method and, for example, either of the Zero-IF method and the Low-IF method may be adopted in the down-converter 12.

The received signal that is converted into the baseband signal is subjected to voltage-current conversion by a wideband operational transconductance amplifier (OTA) 13.

A charge-domain variable filter circuit 14 controls a transfer function composed of combinations of clock frequencies and charge sampling circuits to vary the frequency characteristics of the charge-domain variable filter circuit 14 itself or to add notch characteristics.

Each parameter of the charge-domain variable filter circuit 14 is dynamically controlled by a downstream DSA control unit 43. It is necessary to perform setting of the frequency characteristics, setting of the capacitor characteristics, switching of the circuit mode, etc. to the charge-domain variable filter circuit 14. The local oscillator 31 generates a local frequency signal in accordance with a frequency selection-and-control signal supplied from the DSA control unit 43. A charge-domain clock generating unit 32 generates multiple clock signals having different phases from the local frequency signal and supplies the generated clock signals to the charge-domain variable filter circuit 14. The DSA control unit 43 supplies instructions concerning the amount of variation in the capacitance, the conversion timing, and the circuit mode to the charge-domain variable filter circuit 14.

The charge-domain variable filter circuit is a filter circuit drawing attention in recent years. The charge-domain variable filter circuit can transmit and receive signals by charge sharing to compose, for example, a finite impulse response (FIR) filter circuit as a sampling filter circuit in discrete time. In general, the charge-domain variable filter circuit mainly includes a switch (a metal oxide semiconductor (MOS) switch) and a transconductor (the MOS capacitance). Accordingly, the charge-domain variable filter circuit is less prone to receive a restriction on the power voltage, compared with complementary MOS (CMOS) analog design methods in the related art, and has the advantage of being capable of actively benefiting from the reduction in size of the CMOS process. In addition, the charge-domain variable filter circuit is capable of directly sampling or filtering the RF signals within a GHz-band.

For example, it is possible to easily realize the charge-domain variable filter circuit that has a gain control function and that has a small amount of variation by using a technology disclosed in, for example, Atsushi Yoshizawa, Sachio Iida, 2008, "A Gain-Boosted Discrete-Time Charge-Domain FIR LPF with Double-Complementary MOS Parametric Amplifiers", IEEE International Solid-State Circuits Conference p. 68-69 or Japanese Unexamined Patent Application Publication 2006-246001 that has been assigned to the assignee.

Applying a control signal to the variable capacitor in the charge sampling unit in the charge-domain variable filter circuit 14 can cause the charge-domain variable filter circuit 14 to perform part of a gain varying function necessary for general receivers, that is, part of an operation for Automatic Gain Control (AGC) to constantly quantize the received signal in an optimal dynamic range. If it is not possible to sufficiently perform the AGC control only by the charge-domain variable filter circuit 14, the gain is controlled in detail by a programmable gain amplifier (PGA) 15 downstream of the charge-domain variable filter circuit 14. Specifically, an AGC control unit 41 generates a signal used for the gain control on the basis of the result of demodulation of the baseband signal in a baseband demodulation unit 42 and supplies the generated signal to the PGA 15.

According to the present embodiment of the present invention, the charge-domain variable filter circuit 14 in the reception line is also used to shape the received baseband signal and attenuate an interference signal component from the primary system in order to avoid the interference from the primary system to the secondary system (described below). In the cognitive radio communication system, the avoidance of the interference from the secondary system to the primary system is a requisite condition for the secondary system while the avoidance of the interference from the primary system to the secondary system is optional.

The received signal subjected to the AGC control by the charge-domain variable filter circuit 14 and the downstream PGA 15 is supplied to an analog-to-digital converter (ADC) 16 to be converted into a digital signal.

The received digital signal is subjected to demodulation processing in the baseband demodulation unit 42 and is passed to a higher-layer protocol (not shown) as received data. According to the present embodiment of the present invention, for example, the OFDM is applied as the modulation method for the baseband signal. In the OFDM, the frequency of each carrier is set so that the subcarriers are orthogonal to each other in the symbol segment. "The subcarriers are orthogonal to each other" means that the peak point of the spectrum of a certain subcarrier constantly coincides with the zero point of the spectrum of another subcarrier and no cross talk occurs between the subcarriers. In this case, each carrier has a narrower bandwidth and the efficiency of frequency usage is very high to provide higher resistance to frequency selective fading.

In general, in the communication method using the OFDM, the baseband demodulation unit 42 is provided with a fast Fourier transformer (FFT) (not shown). The FFT is capable of detecting a signal in the frequency domain to relatively easily check the frequency band (subcarrier) having an interference wave from the primary system. In order to detect the interference signal, the replica of a received signal that is desired by the secondary system may be cancelled from all the received signals to further improve the detection level.

The DSA control unit 43 selectively uses the frequency band that is used so as not to interfere with the primary system as the secondary system on the basis of information about the level of the interference wave from the primary system and the frequency of the primary system, detected by the baseband demodulation unit 42. For example, the DSA control unit 43 causes the local oscillator 31 to select the frequency that does not interfere with the primary system and causes a baseband modulation unit 44 to perform spectrum shaping (for example, a notch is made in the subcarrier interfering with the primary system) as the baseband processing. However, since it is generally not possible to remove a distortion occurring in the RF processing only by the processing of the baseband modulation signal in the transmission as the secondary system, the level at which the interference wave is suppressed and which is desired by the primary system is not attained. Accordingly, it may be necessary to devise an inventive step in the RF transmission processing stage, in addition to the processing of the baseband signal described above, in order to achieve sufficient quality of service (QoS) for the primary system.

Next, a transmission line of the communication apparatus will now be described in consideration of the problem of the interference from the secondary system to the primary system.

The baseband modulation unit 44 performs predetermined modulation processing, such as the OFDM, to transmitted data requested from the higher-layer protocol (not shown). In this case, the baseband modulation unit 44 is provided with an inverse FFT (IFFT) (not shown) that converts a signal in the frequency domain to a signal in the time domain. As described above, the baseband modulation unit 44 performs the spectrum shaping (for example, a notch is made in the subcarrier interfering with the primary system) to the transmitted baseband signal. However, it may not generally be possible to sufficiently remove the interference signal component from the secondary system to the primary system due to a distortion occurring in the RF processing only by the processing of the baseband modulation signal, as described above.

A digital-to-analog converter (DAC) 24 converts the baseband signal into an analog signal that is subsequently subjected to RF transmission processing. The DAC is often a current addition circuit. The current-addition-type DAC is compatible with a downstream charge-domain variable filter circuit 23 that performs arithmetic processing to a signal in the charge domain because the current-addition-type DAC basically arranges current cells in parallel in accordance with the bit positions in the digital waveform signal and outputs the sum of the currents passing through the current cells.

The charge-domain variable filter circuit 23 controls a transfer function composed of combinations of clock frequencies and charge sampling circuits to vary the frequency characteristics of the charge-domain variable filter circuit 23 itself or to add notch characteristics, as in the charge-domain variable filter circuit 14. Each parameter of the charge-domain variable filter circuit 23 is dynamically controlled by the DSA control unit 43 (multiple clock signals having different phases are supplied from the charge-domain clock generating unit 32 to the charge-domain variable filter circuit 23 and instructions concerning the amount of variation in the capacitance, the conversion timing, and the circuit mode are supplied from the DSA control unit 43 to the charge-domain variable filter circuit 23).

According to the present embodiment of the present invention, in order to satisfy the prerequisites of the cognitive radio communication, in which the transmitted baseband signal is further shaped in the RF stage and the interference signal component from the secondary system to the primary system is attenuated to avoid the interference from the secondary system to the primary system, the charge-domain variable filter circuit 23 is used in the transmission line, in addition to the charge-domain variable filter circuit 14 in the reception line.

The DSA control unit 43 has detected the information about the level of the interference wave from the primary system and the frequency of the primary system in the reception processing prior to the transmission processing, as described above. Accordingly, the DSA control unit 43 can control each parameter of the charge-domain variable filter circuit 23 to suppress the interference wave in the stage of the RF analog signal processing to the level that is not attained in the spectrum shaping in the baseband modulation unit 44 (described above).

Actively performing the DSA control to the charge-domain variable filter circuit 23 allows the filtering operation having a smaller amount of variation to be realized, compared with the related art. Consequently, it is possible to precisely avoid the mutual interference between the primary system and the secondary system at a lower cost and with lower power consumption.

A downstream up-converter 22 uses a local frequency signal that is supplied from the local oscillator 31 and that is selected so as not to interfere with the primary system to convert the transmitted RF signal into a signal within the frequency band that is used. However, the up-conversion method adopted in the up-converter 22 is not restricted to a specific up-conversion method and, for example, either of the Zero-IF method and the Low-IF method may be adopted in the up-converter 22.

A power amplifier (PA) 21 amplifies the transmitted RF signal to a desired level. The RF band pass filter (BPF) 2 attenuates unnecessary signals outside the used frequency band and the transmitted signal is emitted in the air through the antenna 1.

As described above, the avoidance of the interference from the secondary system to the primary system is a requisite condition for the cognitive radio secondary system while the avoidance of the interference from the primary system to the secondary system is optional. However, avoiding the interference from the primary system to the secondary system by using the charge-domain variable filter circuit 14 in the reception line in the RF processing stage allows the substantial reception sensitivity level to be improved. Particularly, if the level of the interference wave from the primary system is high and the level of the received signal desired by the secondary system is relatively low, it is effective to avoid the interference from the primary system to the secondary system. In this case, each parameter of the charge-domain variable filter circuit 14 is dynamically controlled by the DSA control unit 43 (multiple clock signals having different phases are supplied from the charge-domain clock generating unit 32 to the charge-domain variable filter circuit 14 and instructions concerning the amount of variation in the capacitance, the conversion timing, and the circuit mode are supplied from the DSA control unit 43 to the charge-domain variable filter circuit 14).

Figure 2:
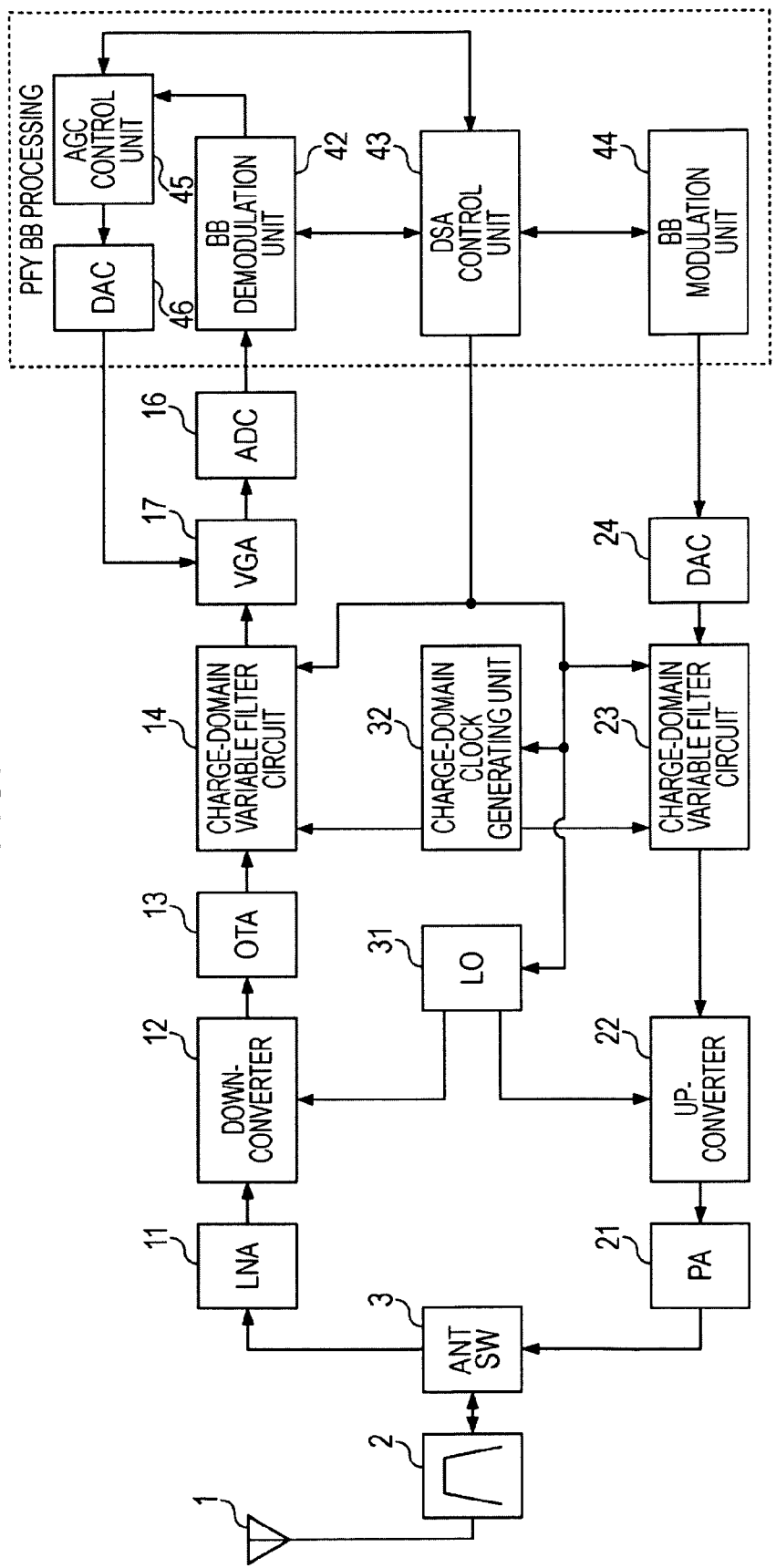
FIG. 2 is a block diagram schematically showing an example of the configuration of a communication apparatus that uses a VGA downstream of a charge-domain variable filter circuit to perform detailed gain control.

In the example shown in FIG. 1, if the AGC is not sufficiently performed only by the charge-domain variable filter circuit 14, the PGA 15 is used to perform the detailed gain control, as described above. However, a variable gain amplifier (VGA) varying the gain using an analog control voltage may be used, instead of the PGA 15. FIG. 2 is a block diagram schematically showing an example of the configuration of a communication apparatus that uses a VGA 17 downstream of the charge-domain variable filter circuit 14 to perform detailed gain control. Specifically, an AGC control unit 45 generates a signal used for the gain control on the basis of the result of the demodulation of the baseband signal in the baseband demodulation unit 42. A DAC 46 converts the signal generated by the AGC control unit 45 into an analog signal and supplies the resulting analog signal to the VGA 17.

As described above, in order to dynamically control the charge-domain variable filter circuit 23 and the charge-domain variable filter circuit 14 by the DSA control unit 43 to suppress the interference from the secondary system to the primary system and the interference from the primary system to the secondary system, it is necessary to precisely detect the signal transmitted from the primary system, included in the received signal. A technology called "spectrum sensing" is applied to the detection of the interference signal. Although various methods are proposed for the spectrum sensing, the present invention is not restricted to a specific method and a method appropriate for the secondary system may be adopted.

The DSA control unit 43 supplies the parameters to the charge-domain variable filter circuit 23 in the transmission line and to the charge-domain variable filter circuit 14 in the reception line. When the communication apparatus shown in FIG. 1 or FIG. 2 performs Time Division Duplex (TDD) communication, that is, when the transmission line and the reception line use the same frequency band, the same parameters may be supplied to the charge-domain variable filter circuit 23 and the charge-domain variable filter circuit 14. In contrast, when the communication apparatus shown in FIG. 1 or FIG. 2 performs Frequency Division Duplex (FDD) communication, the parameters supplied to the charge-domain variable filter circuit 23 differ from those supplied to the charge-domain variable filter circuit 14 because the relative relationship between the transmission frequency band and the interference signal component from the primary system differs from that between the reception frequency band and the interference signal component from the primary system.

Figure 3:
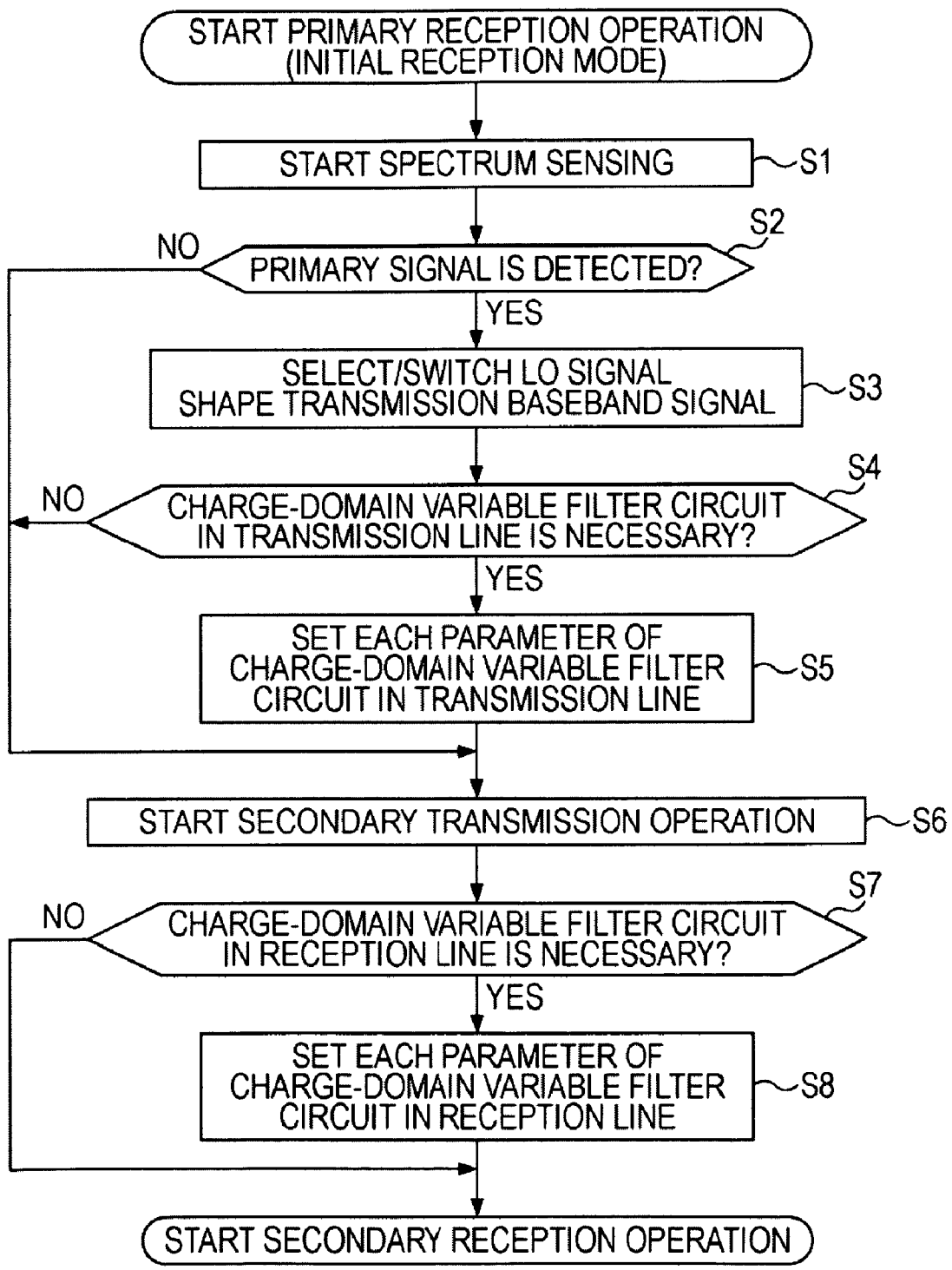
FIG. 3 is a flowchart showing an example of a DSA operation performed in the communication apparatus shown in FIG. 1 or FIG. 2.
Figure 4:
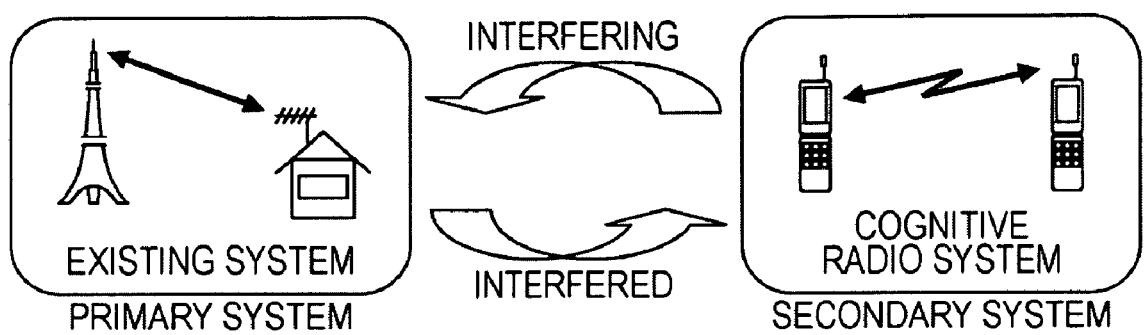
FIG. 4 schematically illustrates an example of the configuration of a cognitive radio system including a primary system and a secondary system.

FIG. 3 is a flowchart showing an example of a DSA operation performed in the communication apparatus shown in FIG. 1 or FIG. 2. The avoidance of the interference from the secondary system to the primary system and the avoidance of the interference from the primary system to the secondary system that are performed in the RF processing stage feature the DSA operation in FIG. 3.

Referring to FIG. 3, when a primary reception operation is started as the initial reception mode, in Step S1, the spectrum sensing is performed to detect a signal transmitted from the primary system. For example, a frequency band (subcarrier) including an interference wave is detected by the FFT in the baseband demodulation unit 42 in the spectrum sensing (described above).

In Step S2, it is determined whether a signal transmitted from the primary system is detected. If it is determined that a signal transmitted from the primary system is detected (YES in Step S2), then in Step S3, the DSA control unit 43 selectively uses the frequency band that is used so as not to interfere with the primary system as the secondary system on the basis of information about the level of the interference wave from the primary system and the frequency of the primary system, detected by the baseband demodulation unit 42. Specifically, the DSA control unit 43 causes the local oscillator 31 to select the frequency that does not interfere with the primary system and causes the baseband modulation unit 44 to perform the spectrum shaping to the transmitted signal (for example, a notch is made in the subcarrier interfering with the primary system) as the baseband processing.

In Step S4, it is determined whether the spectrum shaping is necessary in the RF processing stage by using the charge-domain variable filter circuit 23 in the transmission line in order to realize the sufficient QoS in the primary system.

If it is determined that the spectrum shaping is necessary in the RF processing stage (YES in Step S4), then in Step S5, the DSA control unit 43 dynamically controls each parameter of the charge-domain variable filter circuit 23. After the control of each parameter of the charge-domain variable filter circuit 23 is completed, if it is determined that a signal transmitted from the primary system is not detected (NO in Step S2), and if it is determined that the spectrum shaping is not necessary in the RF processing stage in order to avoid the interference from the secondary system to the primary system (NO in Step S4), then in Step S6, the communication apparatus starts a data transmission operation as the communication apparatus of the secondary system.

In Step S7, it is determined whether it is necessary to further remove the interference signal from the primary system to the secondary system by the charge-domain variable filter circuit 14 in the reception line.

The removal of the interference signal from the primary system to the secondary system is not a requisite condition for the secondary system. For example, when the level of the interference wave from the primary system is high and the level of the received signal desired by the secondary system is relatively low, it is necessary to remove the interference signal from the primary system to the secondary system by the charge-domain variable filter circuit 14 in the reception line.

If it is determined that it is necessary to further remove the interference signal from the primary system to the secondary system by the charge-domain variable filter circuit 14 in the reception line (YES in Step S7), then in Step S8, the DSA control unit 43 dynamically controls each parameter of the charge-domain variable filter circuit 14 in the reception line. If it is determined that it is not necessary to further remove the interference signal from the primary system to the secondary system by the charge-domain variable filter circuit 14 in the reception line (NO in Step S7), Step S8 is skipped. After Step S8, the communication apparatus starts a data reception operation as the communication apparatus of the secondary system.

The present application contains subject matter related to that disclosed in Japanese Priority Patent Application JP filed in the Japan Patent Office on May 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary communication system apparatus comprising:
  radio-frequency transmission-reception processing means for performing radio-frequency processing to a transmitted signal and a received signal;
  baseband processing means for performing baseband processing;
  signal detecting means for detecting a signal from which a signal transmitted from a primary communication system is detected;
  and interference-to-another-communication-system avoiding means for suppressing an interfering signal to the primary communication system in radio-frequency transmission processing by the radio-frequency transmission-reception processing means if the signal detecting means detects a signal.

2. The secondary communication system apparatus according to claim 1, wherein the signal detecting means detects a signal transmitted from the primary communication system by spectrum sensing in the baseband processing means, and wherein the interference-to-another-communication-system avoiding means selectively uses a frequency band that is used of a transmitted signal so as not to interfere with the primary communication system on the basis of the result of the detection by the signal detecting means.

3. The secondary communication system apparatus according to claim 1, wherein the interference-to-another-communication-system avoiding means is provided with a transmission charge-domain variable filter circuit in a transmission line of the radio-frequency transmission-reception processing means and sets each control parameter for the transmission charge-domain variable filter circuit so that the transmission charge-domain variable filter circuit has frequency characteristics to suppress an interfering signal component to the primary communication system.

4. The secondary communication system apparatus according to claim 1, wherein the baseband processing means adopts an Orthogonal Frequency Division Multiplexing modulation method, and wherein the signal detecting means detects a received signal subjected to the Orthogonal Frequency Division Multiplexing modulation in the baseband processing means in a frequency domain to detect a frequency band including an interference wave with the primary communication system.

5. The secondary communication system apparatus according to claim 4, wherein the baseband processing means performs spectrum shaping for avoiding the interference to the primary communication system to a transmitted baseband signal on the basis of the result of the detection by the signal detecting means, and wherein the interference-to-another-communication-system avoiding means suppress the interfering signal to the primary communication system in the radio-frequency transmission processing by the radio-frequency transmission-reception processing means if a desired level at which the interference wave is suppressed is not achieved by the spectrum shaping in the baseband processing means.

6. The secondary communication system apparatus according to claim 1, further comprising: interference-from-another-communication-system avoiding means for suppressing an interfered signal from the primary communication system in radio-frequency reception processing by the radio-frequency transmission-reception processing means if the signal detecting means detects a signal.

7. The secondary communication system apparatus according to claim 6, wherein the interference-from-another-communication-system avoiding means is provided with a reception charge-domain variable filter circuit in a reception line of the radio-frequency transmission-reception processing means and sets each control parameter for the reception charge-domain variable filter circuit so that the reception charge-domain variable filter circuit has frequency characteristics to suppress an interfered signal component from the primary communication system.

8. The secondary communication system apparatus according to claim 6, wherein the interference-from-another-communication-system avoiding means suppress the interfered signal from the primary communication system if the level of the interference wave from the primary communication system is high and a desired level of the received signal is relatively low.

9. A secondary communication system apparatus comprising:
  a radio-frequency transmission-reception processing unit configured to perform radio-frequency processing to a transmitted signal and a received signal;
  a baseband processing unit configured to perform baseband processing;
  a signal detecting unit configured to detect a signal from which a signal transmitted from a primary communication system is detected;
  and an interference-to-another-communication-system avoiding unit configured to suppress an interfering signal to the primary communication system in radio-frequency transmission processing by the radio-frequency transmission-reception processing unit if the signal detecting unit detects a signal.

* * * * *